United States Patent [19]

Ohe et al.

[11] Patent Number: 4,788,549
[45] Date of Patent: Nov. 29, 1988

[54] AUTOMOTIVE ANTENNA SYSTEM

[75] Inventors: Junzo Ohe; Hiroshi Kondo, both of Aichi, Japan

[73] Assignee: Toyota Jidosha Kabushiki Kaisha, Toyota, Japan

[21] Appl. No.: 801,772

[22] Filed: Nov. 26, 1985

[30] Foreign Application Priority Data

Nov. 27, 1984 [JP] Japan .................................. 59-251242

[51] Int. Cl.⁴ .............................................. H01Q 1/32
[52] U.S. Cl. ................................................... 343/72
[58] Field of Search ........................ 343/711, 712, 713

[56] References Cited

PUBLICATIONS

Patent Abstracts of Japan, vol. 7, No. 65 (E-165) [210], 19th Mar. 1983; & JP-A-57 212 803 (Matsushita Denki Sangyo K.K.), 27-12-1982.
Patent Abstracts of Japan, vol. 7, No. 162 (E-187) [1307], 15th Jul. 1983; & JP-A-58 70640 (Toyota Jidosha Kogyo K.K.), 27-04-1983.
Patent Abstracts of Japan, vol. 6, No. 37 (E-97) [915], 6th Mar. 1982; & JP-A-56 156 030 (Nissan Jidosha K.K.), 02-12-1981.

*Primary Examiner*—William L. Sikes
*Assistant Examiner*—Robert E. Wise
*Attorney, Agent, or Firm*—Cushman, Darby & Cushman

[57] ABSTRACT

The present invention provides a diversity reception type automotive antenna system comprising two pairs of high-frequency pickups for detecting surface high-frequency currents induced on the vehicle body by radio or other waves and flowing concentrically in the marginal edges of the vehicle body, each of said two pairs of high-frequency pickups being mounted respectively on one of the front pillars and one of the trunk hinges at the same side of the vehicle body to form a non-directional antenna unit, the non-directional antenna units being changed from one to another only depending on variations in the level of the radio or other waves due to variations in the electric field to reduce the frequency of change from one antenna unit to the other and noise due to variations in S/N ratio and at the same time to maintain the same reception in the automotive antenna system irrespective of the direction of the vehicle body relative to the incoming waves.

7 Claims, 9 Drawing Sheets

AUTOMOTIVE ANTENNA SYSTEM

BACKGROUND OF THE INVENTION

1. Field of the Invention

The present invention relates to an automotive antenna system for diversity reception.

2. Description of the Prior Art

It is difficult to receive radio waves steadily in a moving automobile at all times. Waves utilized in FM broadcast belonging to high frequency bands known as VHF bands have strong straight-going properties. Direct waves tend to interfere with waves reflected by buildings or mountains to create multi-path noise.

An automotive antenna system for diversity reception has ben proposed to improve the directional pattern and to reduce the multi-path noise such that radio waves can well be received at all times irrespective of the direction of the vehicle body relative to the incoming waves. Such an automotive antenna system comprises two pole antennas having their directivities, which are mounted on the vehicle body. The output from each of the pole antennas is selectively supplied to the input of a high-frequency amplifier. This high-frequency amplifier has its rearward stage connected with an intermediate amplifier which in turn is adapted to generate voltages proportional to the electric field intensity. These voltages are compared and calculated such that radio waves can steadily be received by one of the two pole antennas which has an increased intensity of electric field with less disturbance from multi path noises.

In the prior art diversity reception type automotive antenna systems, each utilizing two directional pole antennas, therefore, the outputs of the pole antennas were varied through an increased extent because of variations in the electric field and of the directivities of the pole antennas. Thus, the pole antennas were more frequently changed from one to another to generate noise on variations of S/N ratio.

SUMMARY OF THE INVENTION

It is therefore an object of the present invention to provide an improved diversity reception type automotive antenna system comprising two antenna means which can be changed from one to another only on variations of radio waves due to changes in the electric field in order to reduce the frequency of changes between the antenna means and noise due to the changes of S/N, ratio, and which can positively be maintained at the same reception irrespective of the direction of vehicle body relative to the incoming waves.

To accomplish the above object, the present invention provides a diversity reception type automotive antenna system comprising non-directional antenna means including two pairs of high-frequency pickups mounted respectively in the front pillars and trunk hinges of the vehicle body for detecting surface high-frequency currents which are induced on the vehicle body by radio waves and which flow concentratedly on the marginal edges of the vehicle body, each of said two pairs of high-frequency pickups being respectively disposed on one of the front pillars and one of the trunk hinges at the same side of the vehicle body to form a non-directional antenna unit, one of said non-directional antenna units being selected depending on variations of the level of the radio waves due to variations of the electric field.

DETAILED DESCRIPTION OF PREFERRED EMBODIMENTS:

Referring first to FIGS. 11 to 16, there is illustrated a process of searching the distribution of high-frequency currents on the vehicle body to determine a location at which an automotive antenna system according to the present invention can operate with the most efficiency.

Figure 11:
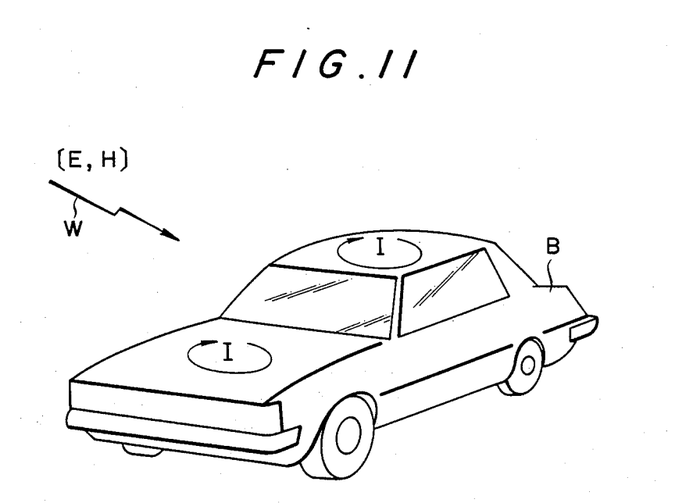
FIG. 11 illustrates surface currents I induced on a vehicle body B by external waves W.

FIG. 11 shows that when radio or other waves W pass through a vehicle body B of conductive metal, surface currents I having its intensity corresponding to that of the waves are induced on the vehicle body at various locations. The present invention is intended to receive radio or other waves belonging to relatively high frequency bands equal to or higher than 50 MHz.

The distribution of surface currents may be determined by a simulation utilizing a computer and by actually measuring the intensity of current at each of the locations on the vehicle body. The measurement of current intensity may be made by a probe constructed and functioning in accordance with the same principle as that of a high-frequency pickup which is positioned on the vehicle body at a desired location as will be described. The probe is moved throughout the surface of the vehicle body while being angularly rotated at each of the locations on the vehicle body.

Figure 12:
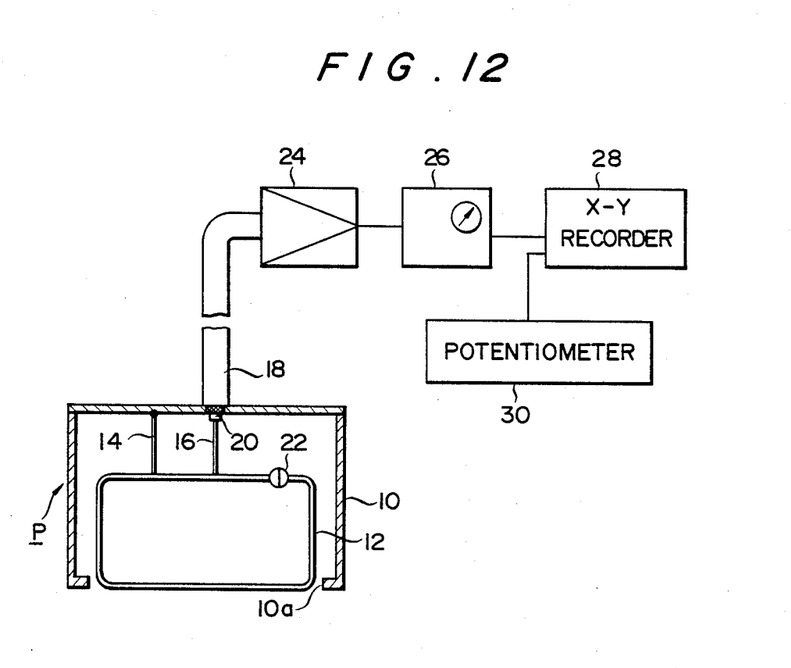
FIG. 12 illustrates a probe and its processing circuit used to determine the distribution of surface currents on the vehicle body, the probe being constructed and functioning in accordance with the same principle as that of a high-frequency pickup used in the present invention.

FIG. 12 shows such a probe which comprises a casing 10 of electrically conductive material and a loop coil 12 located within the casing 10 and protected from any undesirable and external waves by the casing 10. The casing 10 is provided with an opening 10a through which a portion of the loop coil 12 is externally exposed. The exposed portion of the loop coil 12 is located in close proximity to the surface of the vehicle body 10 such that the loop coil 12 can detect a magnetic flux formed by the surface currents on the vehicle body. The loop coil 12 is electrically connected with the casing 10 through a short-circuiting line 14 and has an output terminal 16 electrically connected with a core 20 in a coaxial cable 18. The loop coil 12 includes a capacitor 22 for causing the frequency of the loop coil 12 to resonate with a desired frequency to be measured to improve the efficiency of picking-up.

As seen from FIG. 12, the output of the probe P is amplified by a high-frequency voltage amplifier 24 the output voltage of which in turn is measured by a high-frequency voltage measuring device 26. The amplified output voltage is then recorded by an X-Y recorder 28 as a signal indicative of the current intensity at each of the locations on the vehicle body. The X-Y recorder 28 also receives a signal indicative of each of the locations on the vehicle body from a potentiometer 30. Therefore, one can know the intensity of surface currents at each location on the vehicle body.

Figure 13:
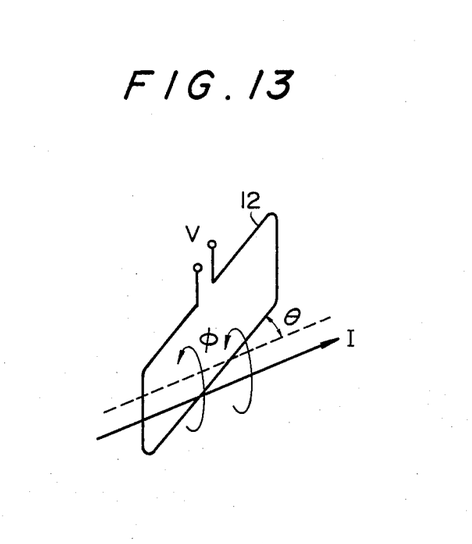
FIG. 13 illustrates the electromagnetic coupling between the surface currents I and a pickup loop antenna.
Figure 14:
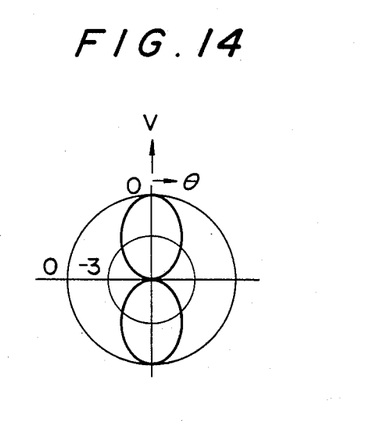
FIG. 14 illustrates the directional pattern of the loop antenna shown in FIG. 13.

FIG. 13 shows a deviation $\theta$ between the surface high-frequency currents I and the loop coil 12 of said probe. As seen from this figure, a magnetic flux $\phi$ formed by the surface currents I intersects the loop coil 12 to create a voltage V to be detected therein. As seen from FIG. 14, the voltage is maximum when the deviation $\theta$ is equal to zero, that is, when the surface currents I flow parallel to the loop coil 12 of the probe. Therefore, the direction of the flowing currents I can be determined when the probe P is angularly rotated to obtain the maximum voltage at each of the locations on the vehicle body.

Figure 15:
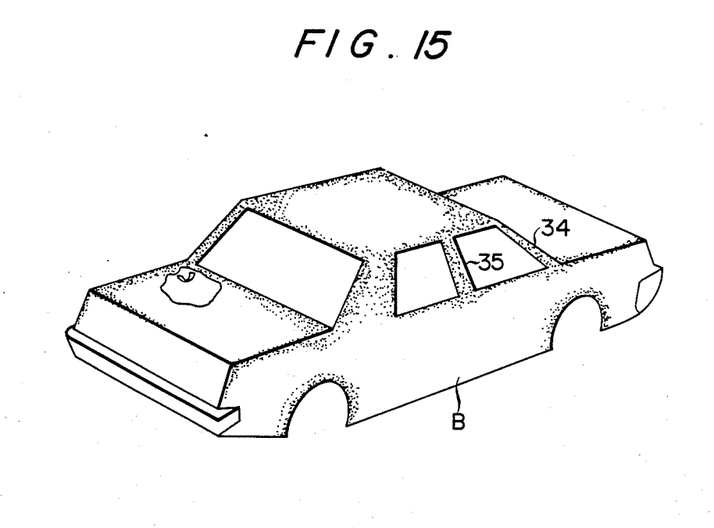
FIG. 15 illustrates the distribution of surface current intensity throughout the vehicle body.
Figure 16:
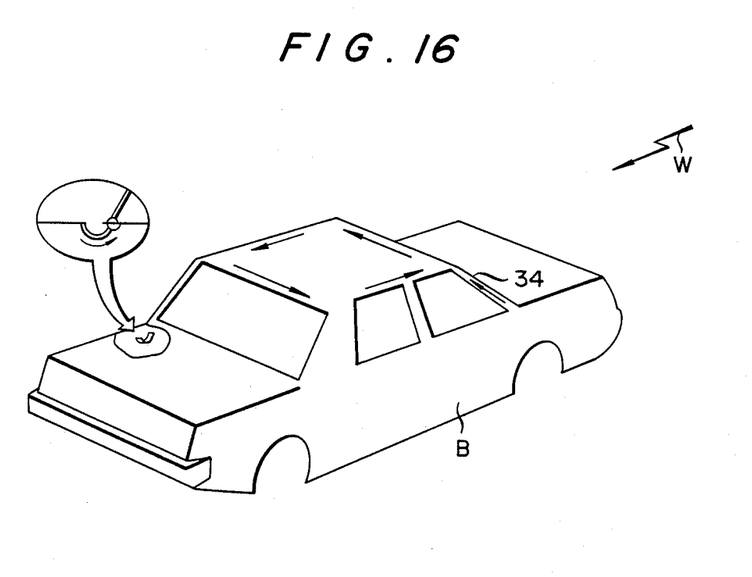
FIG. 16 illustrates the orientation of the surface currents on the vehicle body.

FIGS. 15 and 16 respectively illustrate the magnitude and orientation of surface high-frequency currents which are induced on the vehicle body at various locations by radio or other waves having a frequency equal to 80 MHz and determined by the simulation of the computer and the actual measurements of the probe P. As seen from FIG. 15, the density of the surface currents is higher along the marginal edges of the flat vehicle portions and minimum at the center of each of the flat vehicle portions. It will further be understood from FIG. 16 that the surface currents flow concentratedly on the vehicle body along the marginal edges thereof and along the connection between the flat vehicle portions located adjacent to each other.

This means that the surface currents flow concentratedly in the front pillars, engine hood, trunk lid and hinge portions of the vehicle body. The present invention is characterized by an automotive antenna system which comprises two non-directional antenna units each of which includes two high-frequency pickups respectively mounted on one of the front pillars and one of the trunk hinges at the same side of the vehicle body to detect surface high-frequency currents which are induced on the vehicle body by radio or other waves, which flow concentratedly on the front pillar and trunk hinge.

Figure 1:
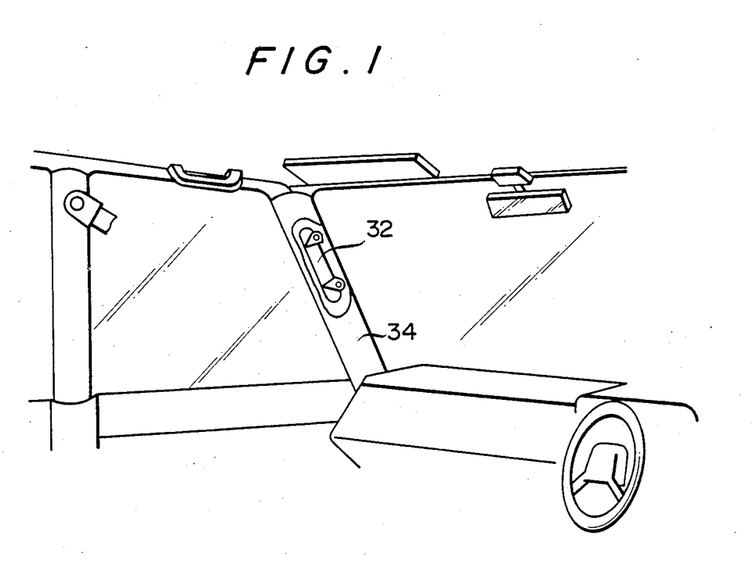
FIG. 1 illustrates a front pillar in which one of a pair of high-frequency pickups defining a non-directional antenna unit used in a diversity reception type automotive antenna system according to the present invention is mounted.

Referring now to FIG. 1, there is shown a high-frequency pickup 32 used to define one non-directional antenna unit and which is mounted in one of the front pillars 34 on the vehicle body. In the illustrated embodiment, the high-frequency pickup 32 is in the form of an electromagnetic coupling type pickup including a loop antenna.

Figure 2:
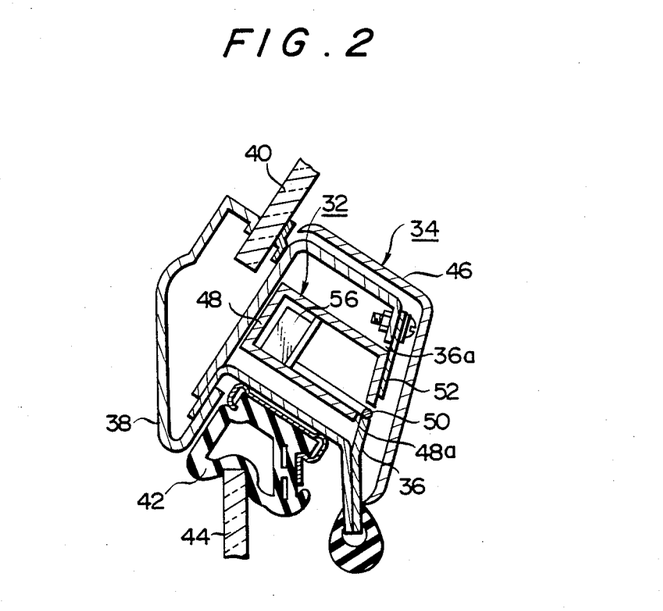
FIG. 2 is a cross-sectional view of the front pillar shown in FIG. 1, in which an electromagnetic coupling type high-frequency pickup is mounted.

As seen from FIG. 2, the front pillar 34 includes a pillar leg plate 36 which is in the form of a hollow quadrilateral column. The outer wall of the pillar leg plate 36 fixedly supports a windshield molding 38 which in turn supports a windshield glass 40.

A weather strip 42 of rubber is fixedly mounted on the rearward side of the pillar leg plate 36 and serves as a sealing element between the pillar leg plate 36 and a sidewindow glass 44.

The inner wall of the pillar leg plate 36 faced to the interior of the passenger room is covered by a front pillar garnish 46 to provide an aesthetic appearance for the front pillar.

The high-frequency pickup 32 is disposed in the hollow interior of the pillar leg plate 36 parallel to the length of the front pillar 34.

Figure 3:
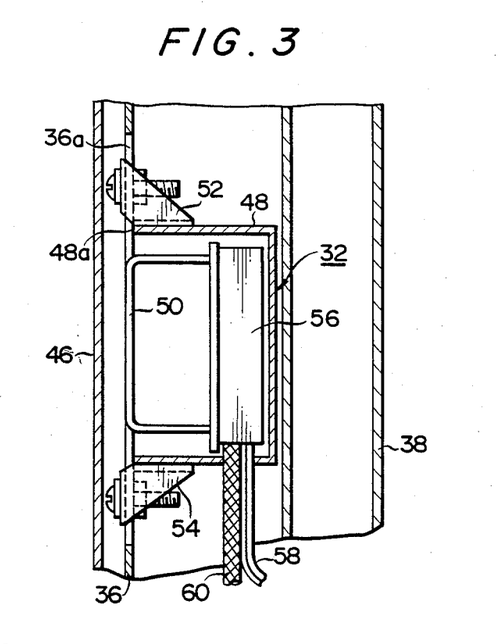
FIG. 3 is a longitudinal section of the primary parts of the front pillar shown in FIG. 2.

As seen from FIGS. 2 and 3, the high-frequency pickup 32 comprises a casing 48 of electrically conductive material and a loop antenna 50 located within the casing 48 and shielded from any external magnetic field by the casing 48. The casing 48 is provided with an opening 48a through which a portion of the loop antenna 50 is externally exposed. The exposed portion of the loop antenna 50 is disposed in close proximity to the front pillar and particularly the pillar leg plate 36 on which the surface high-frequency currents flow concentratedly.

In the present embodiment, the pillar leg plate 36 is provided with an opening 36a through which the high-frequency pickup 32 can be inserted into the hollow column of the pillar leg plate 36 before the front pillar garnish 46 is mounted on the pillar leg plate 36.

The casing 48 includes brackets 52 and 54 fixedly mounted on the opposite ends thereof as by spot-welding. As shown, these brackets 52 and 54 are rigidly fastened to the pillar leg plate 36 as by screws to fixedly mount the casing 48 of the high-frequency pickup 32 on the pillar leg plate 36.

When the high-frequency pickup 32 is thus mounted within the pillar leg plate 36, the loop antenna 50 thereof is disposed in close proximity to the edge of the opening 36a of the pillar leg plate 36 so that the loop antenna 50 will efficiently be intersected by a magnetic flux formed by the surface high-frequency currents flowing concentratedly in the pillar leg plate 36.

The casing 48 also contains a circuit section 56 including a pre-amplifier and others, which is located behind the loop antenna 50. The circuit section 50 is supplied with power and control signals through a cable 58. High-frequency signals detected by the loop antenna 50 are fetched externally through a coaxial cable 60 and then processed by a circuit similar to that used to determine the distribution of surface currents on the vehicle body.

In the illustrated embodiment, the loop antenna 50 is in the form of a single-winding coil which is covered with an insulating layer such that the coil can be electrically insulated from and disposed in close proximity to the marginal edge of the pillar leg plate 36. Thus, the loop antenna 50 can efficiently intersect a magnetic flux formed by the surface high-frequency currents which flow concentrically in the pillar.

After the high-frequency pickup 32 has been mounted in the front pillar 34, the front pillar garnish 46 is mounted on the pillar 34 to provide an appearance similar to those of the conventional pillar constructions.

In accordance with the present invention, the remaining or other high-frequency pickup used to define said one non-directional antenna unit is disposed on one trunk hinge at the same side of the vehicle body including the front pillar 34 on which said one high-frequency pickup 32 is mounted.

Radio or other waves belonging to FM frequency bands induce surface currents on the trunk hinges of the vehicle body with densities equal to or higher than those of the other vehicle portions. This tendency is increased as the level of frequency is increased. In addition, the trunk hinges are very remote from the engine which is normally located on the forward end of the vehicle body. Therefore, the high-frequency pickup is not influenced substantially by noise from the vehicle body, and thus provide signals which are superior in S/N ratio.

Figure 4:
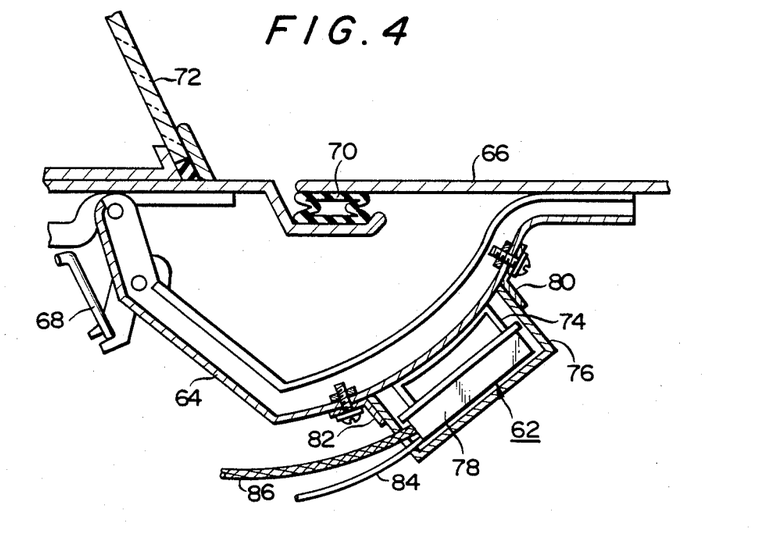
FIG. 4 is a cross-sectional view of the primary parts of a trunk hinge on which the other high-frequency pickup is mounted.
Figure 5:
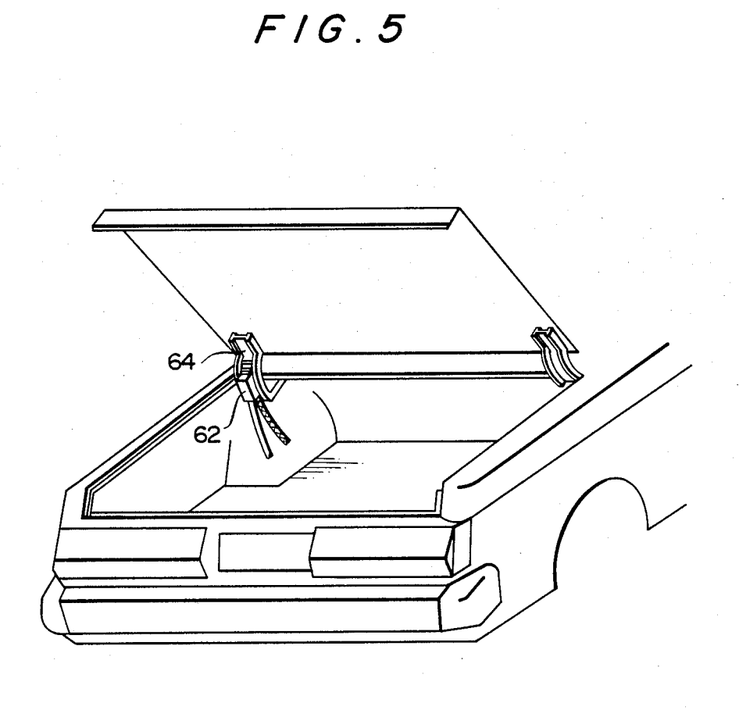
FIG. 5 is a schematic and perspective view of the trunk hinge of FIG. 4 on which the pickup is mounted.

Referring now to FIGS. 4 and 5, there is shown one of two trunk hinges 64 on which the other high-frequency pickup 62 is mounted. Each of the trunk hinges 64 is pivotally mounted at one end by the vehicle body. The other end of the trunk hinge 64 is rigidly mounted on the inner wall of the trunk lid 66. The trunk hinge 64 is provided with a torsion bar 68 functioning to resiliently position the trunk lid 66 in its open state. As is well-known, a water-tight weather strip 70 is provided between the trunk lid 66 and the vehicle body to prevent any external water such as rain from penetrating into the interior of the vehicle body through a rearwindow glass 72.

In the illustrated embodiment, the high-frequency pickup 62 is rigidly mounted on the side of the trunk hinge 64 faced to the trunk room. The high-frequency pickup 62 includes a loop antenna 74 the length of which extends parallel to that of the trunk hinge 64. Thus, the loop antenna 74 can positively and efficiently detect surface currents flowing in the trunk hinge 64.

The high-frequency pickup 62 comprises a casing 76 of electrically conductive material in which said loop antenna 74 and a circuit section 78 including a preamplifier and others are housed. The casing 76 is provided with an opening toward the trunk hinge 64. The casing 76 includes L-shaped fittings 80 and 82 at the opposite ends of the opening. Each of the fittings 80 and 82 is firmly screwed at one end on the trunk hinge 64. Thus, the loop antenna 74 within the casing 76 can detect only a magnetic flux formed by the surface high-frequency currents flowing in the trunk hinge 64 and can be positively shielded from any external flux by the casing 76.

The loop antenna 74 is preferably shaped to be compatible with the curvature of the trunk hinge 64.

The circuit section 78 is supplied with power and control signals through a cable 84. High-frequency signals detected by the loop antenna 74 are fetched externally through a coaxial cable 86 and then processed by a circuit similar to that used on determining the distribution of surface currents.

The loop antenna 74 is in the form of a single-winding coil which is covered with an insulating layer such that the coil can be electrically insulated from and disposed in close contact with the trunk hinge 64. Therefore, the loop antenna can efficiently be intersected by a magnetic flux formed by the surface currents.

The high-frequency pickups 32 and 62 respectively mounted on the front pillar 34 and trunk hinge 64 are different from each other in directional pattern. However, a non-directional antenna unit can be defined by these two high-frequency pickups 32 and 62 by the use of a phase compensating circuit and a combining circuit which will be described.

Although not illustrated, two similar high-frequency pickups are mounted respectively on the other front pillar and trunk hinge at the opposite side of the vehicle body. These two high-frequency pickups form another non-directional antenna unit used to form the diversity reception type automotive antenna system according to the present invention.

Figure 6:
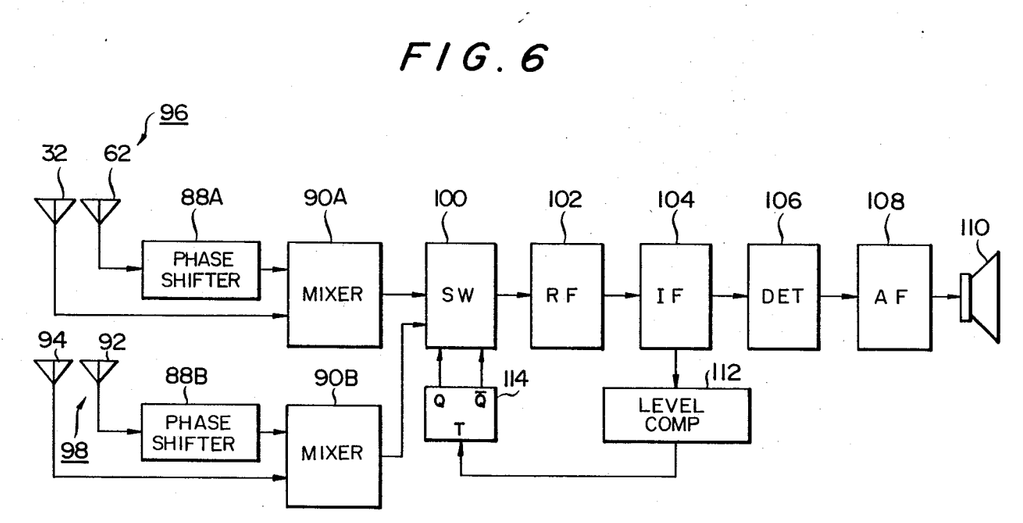
FIG. 6 is a circuit diagram of an automotive antenna system according to the present invention.

Two non-directional antenna units thus formed are changed from one to another by circuitry, as shown in FIG. 6, such that good reception can be maintained in the automotive antenna system according to the present invention.

As shown in FIG. 6, the high-frequency pickup 62 mounted on the trunk hinge 64 is electrically connected with a combining circuit 90A through a phase compensating circuit 88A. The high-frequency pickup 32 mounted on the front pillar 34 at the same side of the vehicle body as that of the trunk hinge 64 is electrically connected directly with the combining circuit 90A.

The phase compensating circuit 88A causes the phase of radio waves received by the high-frequency pickup 62 having a shorter cable to match that of waves received by the high-frequency pickup 32 having a longer cable. The combining circuit 90A serves to totalize the output signals from both the high-frequency pickups 32 and 62.

Similarly, a high-frequency pickup 92 mounted on the other trunk hinge at the opposite side of the vehicle body also is electrically connected with a combining circuit 90B through a phase compensating circuit 88B. Another high-frequency pickup 94 mounted on the other front pillar at the same side of the vehicle body as that of the high-frequency pickup 92 is electrically connected directly with the combining circuit 90B.

Figure 7:
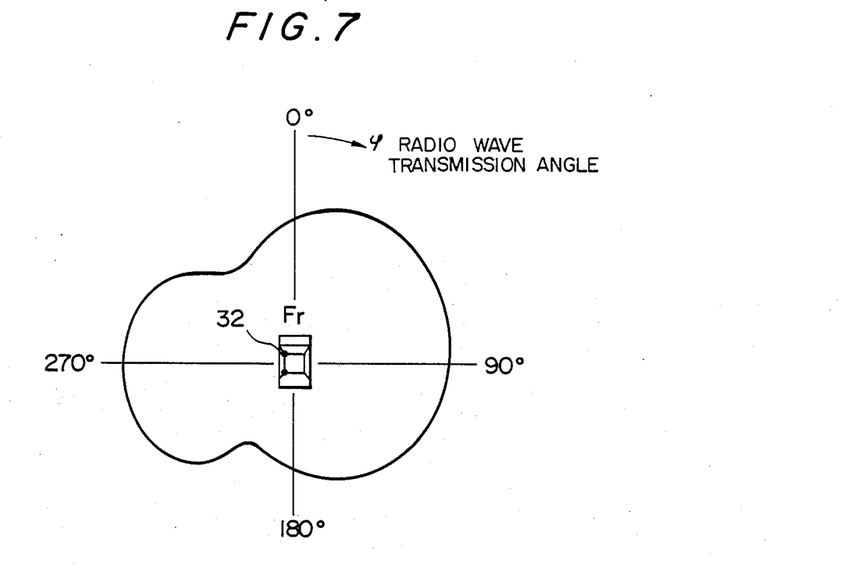
FIG. 7 illustrates the directional pattern of the high-frequency pickup mounted in the front pillar.
Figure 8:
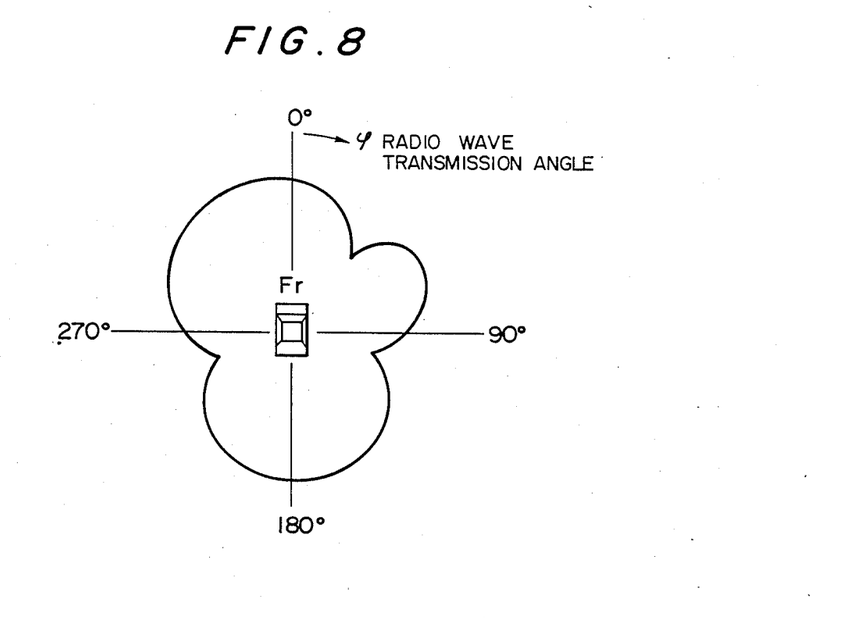
FIG. 8 is a view similar to FIG. 7, showing the directional pattern of the high-frequency pickup mounted on the trunk hinge.
Figure 9:
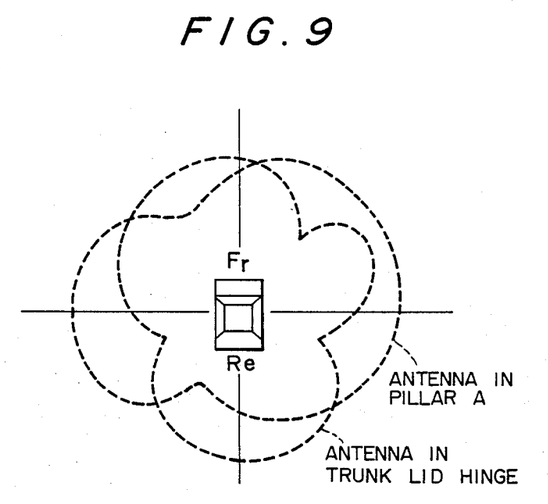
FIGS. 9 and 10 illustrate the directional pattern of a non-directional antenna unit defined by the two high-frequency pickups.
Figure 10:
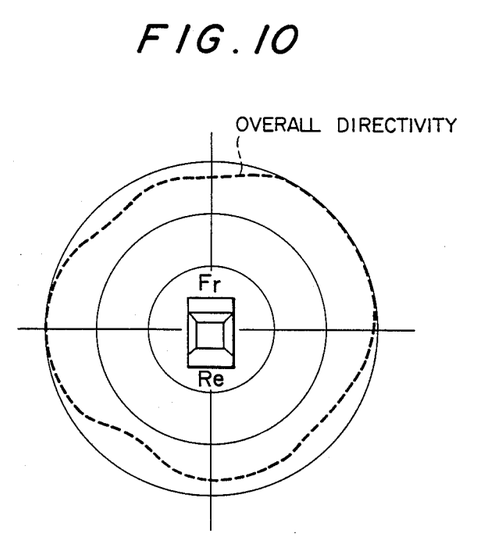

The high-frequency pickup 32 on the front pillar 34 has a directional pattern shown in FIG. 7 while the high-frequency pickup 62 on the trunk hinge 64 has a directional pattern shown in FIG. 8. By combining the outputs of the high-frequency pickups 32 and 62 through the combining circuit 90A, the non-directional antenna unit 96 defined by the high-frequency pickups 32 and 62 will have a directional pattern shown in FIGS. 9 and 10. Similarly, the high-frequency pickups 92 and 94 on the opposite sides of the vehicle body form a non-directional antenna unit 98 having a directional pattern similar to those of FIGS. 9 and 10.

The outputs of both the combining circuits 90A and 90B are selectively supplied to a high-frequency amplifier 102 through a switching circuit 100. The output of the high-frequency amplifier 102 is received by a detector 106 through an intermediate frequency amplifier 104 and then amplified by an audio amplifier 108. Audio signals thus amplified are re-produced by a speaker 110.

On the other hand, the output of the intermediate frequency amplifier 104 also is supplied to a level comparator 112 which is adapted to give a trigger signal to a T-shaped flip flop 114 if the output of the intermediate frequency amplifier 104 is reduced below a predetermined level.

When the T-shaped flip flop 114 receives a trigger signal from the level comparator 112, the output thereof is inverted to change the state of the switching contacts in the switching circuit 100 to automatically select one of the non-directional antenna units which can receive radio or other waves more efficiently.

We claim:

1. An automotive antenna system comprising:
   first high frequency pick up means for detecting vehicle surface high frequency currents induced on the vehicle surface by broadcast waves flowing concentratedly on the vehicle body and for outputting a signal in response to the detected vehicle surface high frequency currents, said first high frequency pick up means being disposed on a first side of the vehicle at the front of the vehicle;
   second high frequency pick up means for detecting vehicle surface high frequency currents induced on the vehicle surface by broadcast waves flowing concentrically on the vehicle body and for outputting a signal in response to the detected vehicle surface high frequency currents, said second high frequency pick up means being disposed on the first side of the vehicle at the rear of the vehicle;
   first combining means for combining the output signals received from said first and second high frequency pick up means and outputting a combined signal;
   third high frequency pick up means for detecting vehicle surface high frequency currents induced on the vehicle surface by broadcast waves flowing concentratedly on the vehicle body and for outputting a signal in response to the detected vehicle surface high frequency currents, said third high frequency pick up means being disposed on the second side, opposite the first side, of the vehicle at the front of the vehicle;
   fourth high frequency pick up means for detecting vehicle surface high frequency currents induced on the vehicle surface by broadcast waves flowing concentratedly on the vehicle body and for outputting a signal in response to the detected vehicle surface high frequency currents, said fourth frequency pick up means being disposed on the second side, opposite the first side, of the vehicle at the rear of the vehicle;
   second combining means for combining the output signals received from said third and fourth high frequency pick up means and outputting a combined signal;
   selection switching means for selecting any one of the combined output signals from said first and second combining means for input to a receiver, comparing the selected combined output signal to a predetermined thereshold level and switching to the other one of the combined output signals from said first and second combining means for input to the receiver when the selected combined output signal is lower than the predetermined threshold level.

2. An automotive antenna system as defined in claim 1 wherein each of said high-frequency pickup means includes a casing of electrically conductive material and a loop antenna housed within said casing, said casing having an opening through which a portion of said loop antenna is exeternally exposed, the exposed portion of said loop antenna being disposed in close proximity to a front pillar or rear trunk hinge on which the surface high-frequency currents flow concentratedly.

3. An automotive antenna system as defined in claim 2 wherein each of said loop antennas is in the form of a single-winding coil which is covered by an insulating layer such that said coil can be electrically insulated from and disposed in close proximity to the marginal edge of the front pillar or rear trunk hinge, whereby said loop antenna can efficiently be intersected by a magnetic flux formed by the surface high-frequency currents flowing concentradedly on the pillar or trunk hinge.

4. An automotive antenna system as defined in claim 2 wherein each of said high-frequency pickup means moutnted on rear trunk hinges is located on the side of the corresponding trunk hinge faced to the trunk room of the vehicle body and disposed parallel to the length of the rear trunk hinge and wherein the loop antenna located within that high-frequency pickup means is positioned to have its length extending parallel to that of the rear trunk hinge.

5. An automotive antenna system as defined in claim 4 wherein the loop antenna in each of said high-frequency pickup means mounted on the rear trunk hinges is shaped to conform with the curvature of the corresponding rear trunk hinge and to extend along the length of said rear trunk hinge.

6. An automotive antenna system as defined in claim 4 wherein the loop antenna in each of said high-frequency pickup means mounted on the rear trunk hinges is in the form of a single-winding coil which is covered by an insulating layer such that said coil can be electrically insulated from and disposed in close contact with the corresponding rear trunk hinge, whereby said loop antenna can efficiently be intersected by a magnetic flux formed by the surface currents flowing on that rear trunk hinge.

7. An automotive antenna system as defined in claim 1, further comprising:
   first phase compensating means, interposed between any one of said first and second high frequency pick up means and said first combining means for matching the phase of the output signals from said first and second high frequency pick up means with each other; and
   second phase compensating means, interposed between any one of said third and fourth high frequency pich up means and said second combining means, for matching the phase of the output signals from said third and fourth high frequency pick up means with each other.

* * * * *